United States Patent
Mura

(10) Patent No.: US 7,177,396 B2
(45) Date of Patent: Feb. 13, 2007

(54) APPARATUS FOR MANAGEMENT AND REMOTE CONTROL OF ELECTRICAL CHARACTERISTICS OF WIRE PAIRS CONNECTED TO A TELEPHONE EXCHANGE

(75) Inventor: Silvano Mura, Galatone (IT)

(73) Assignee: Tyco Electronics Raychem NV (BE)

( * ) Notice: Subject to any disclaimer, the term of this patent is extended or adjusted under 35 U.S.C. 154(b) by 0 days.

(21) Appl. No.: 10/502,669

(22) PCT Filed: Jan. 29, 2003

(86) PCT No.: PCT/IT03/00033

§ 371 (c)(1),
(2), (4) Date: Feb. 4, 2005

(87) PCT Pub. No.: WO03/065699

PCT Pub. Date: Aug. 7, 2003

(65) Prior Publication Data

US 2005/0152508 A1     Jul. 14, 2005

(30) Foreign Application Priority Data

Jan. 30, 2002 (IT) .......................... RM2002A0050
Dec. 16, 2002 (IT) .......................... RM2002A0623

(51) Int. Cl.
*H04M 1/24* (2006.01)
*H04M 3/08* (2006.01)
*H04M 3/22* (2006.01)

(52) U.S. Cl. ............................. 379/29.01; 379/29.05; 379/27.06; 379/27.07; 379/1.01

(58) Field of Classification Search ............... 379/1.01, 379/22, 22.06, 22.07, 26.01, 27.01, 27.06, 379/27.07, 29.01, 29.05, 29.11
See application file for complete search history.

(56) References Cited

U.S. PATENT DOCUMENTS

| | | | | |
|---|---|---|---|---|
| 3,156,783 | A | * | 11/1964 | Alexandersson et al. ... 379/325 |
| 5,309,499 | A | * | 5/1994 | Webber ..................... 379/9.05 |
| 5,854,823 | A | * | 12/1998 | Badger et al. ........... 379/15.01 |
| 6,265,842 | B1 | | 7/2001 | Hard et al. |
| 6,341,159 | B1 | * | 1/2002 | Jollota ..................... 379/22.03 |
| 6,453,014 | B1 | * | 9/2002 | Jacobson et al. ........ 379/26.01 |
| 6,453,015 | B1 | * | 9/2002 | Benedict et al. ......... 379/27.01 |
| 6,584,148 | B1 | * | 6/2003 | Zitting et al. ................ 375/222 |
| 6,594,343 | B1 | * | 7/2003 | Duffie et al. ............... 379/1.01 |
| 6,819,745 | B2 | * | 11/2004 | Hollenbeck et al. ....... 379/1.03 |

FOREIGN PATENT DOCUMENTS

| | | | |
|---|---|---|---|
| WO | WO 99/14917 | * | 3/1999 |
| WO | WO 99/35987 | * | 7/1999 |
| WO | WO 01/93549 | | 12/2001 |

* cited by examiner

*Primary Examiner*—Quoc Tran
(74) *Attorney, Agent, or Firm*—Myers Bigel Sibley & Sajovec

(57) ABSTRACT

An apparatus for the management and the remote and/or automatic control of electric characteristics and signal transmissivity of the metallic line pairs connected to a telephone exchange, including measurement means and means able to connect said measurement means to the single line pairs connected to the telephone exchange and to all of the lines of a distribution whether they are active or redundant.

20 Claims, 4 Drawing Sheets

PRIOR ART

APPARATUS FOR MANAGEMENT AND REMOTE CONTROL OF ELECTRICAL CHARACTERISTICS OF WIRE PAIRS CONNECTED TO A TELEPHONE EXCHANGE

RELATED APPLICATIONS

The present application is a National Phase application of PCT/IT03/00033 filed on Jan. 29, 2003 and published in English, which claims priority from Italian Applications RM2002A000050 filed on Jan. 30, 2002 and RM2002 A000623 filed Dec. 16, 2002, the disclosures of which are incorporated herein by reference.

The present invention relates the field of the dial telephone systems and particularly an apparatus for monitoring electric characteristics and signal transmissivity in line pairs (usually of copper or aluminium) connected to exchanges.

With the liberalization of the telecommunication systems, the major Telephone Companies, once holder of the monopoly, have been compelled to drastically reduce the cost in order to be competitive with the competition of the new Telecommunication Managers.

The prevailing reason of this is the unbalance situation between, on one side, the new Managers having only to pay the rent for telephone networks and services, and, on the other side, the Telephone Companies, once holder of the monopoly, that are burdened with the cost of operation and maintenance of the access network requiring a significant amount of human resources because of the lack of automatic control system, thus generating an important item in the budget of such companies.

However, the cutting of the investment regarding operation and maintenance has the fated consequence of the network quality degradation as far as the quality of the signal and the data transmission rate is concerned.

Regarding the situation of the Company Telecom Italia, the cutting of the budget in recent years have increased the failure rate of the network (number of failures per 100 km cable in a year) from 5–6% of 1997 to 13–14% of today.

Such a situation is further emphasized by the wide band services (ADSL) which need better electric characteristics of the network to operate correctly, thus compelling the Manager to a preventive, quick, effective intervention for improving the efficiency of the lines and to solve the problems on pain of the commercial failure.

On the other side, no Telephone Company can be burdened with the cost of such activity if the latter is carried out by the traditional intervention of technicians.

Therefore, it is self-evident that with the coming of new digital wideband services, in order to achieve a good reliability and quality of the access network with successfully commercial consequences and customer satisfaction as well, it is necessary to perform a new management of the network based on the preventive control of the lines according to the technical requirements of the new services that cannot absolutely be implemented both technically and economically by the traditional modes of operation.

In other words the old operation methods performing an intervention on the network only following a customer's failure notice are extremely burdensome with respect to the new scenery and cause troubles to the customer.

In order to overcome such problems, worldwide telecommunication equipment manufacturing companies such as Teradyne, Sunrise, Turnstone, etc., have provided remote controlled systems for line testing and access network failure detection tested by Telecom Italia, British Telecom, Colt, Cable & Wireless, etc.

The results have been deemed by the Managers not satisfactory because of the lack of reliability of the measurements carried out by such systems. For this reason, a system able to solve this crucial problem is still being developed all over Europe and particularly by British Telecom that first has been looking for a system able not only to test the characteristics of a line but also to detect automatically network failures.

SUMMARY OF THE INVENTION

The main object of the present invention is to provide an apparatus able to carry out automatically and remotely the monitoring of the dial telephone systems (e.g. copper or aluminium) to test electric characteristics and signal transmissivity.

A second object of the invention is to provide means for testing the quality of the lines as far the electric characteristics and the signal transmission rate is concerned, which means does not require any re-wiring of the line pairs or modification of the exchange apparatus to which such line pairs are connected.

A third object of the invention is to provide an apparatus able to test both the line pairs connected to customers and the redundant line pairs and those rented by other managers independent of that they are audio lines, digital lines (ISDN) or wideband lines (ADSL).

This has been accomplished according to the present invention by providing an apparatus which can be remote controlled in any exchange, comprising measurement means and means for the connection of such measurement means to the single line pairs connected to the exchange as well as to all of the lines connected thereto whether they are active or redundant.

BRIEF DESCRIPTION OF THE DRAWINGS

A better understanding of the invention will result from the following description with reference to the accompanying drawings of the known exchanges and two preferred embodiments thereof shown only by way of a not limiting example.

In the drawings.

DETAILED DESCRIPTION OF EMBODIMENTS OF THE INVENTION

Figure 1:
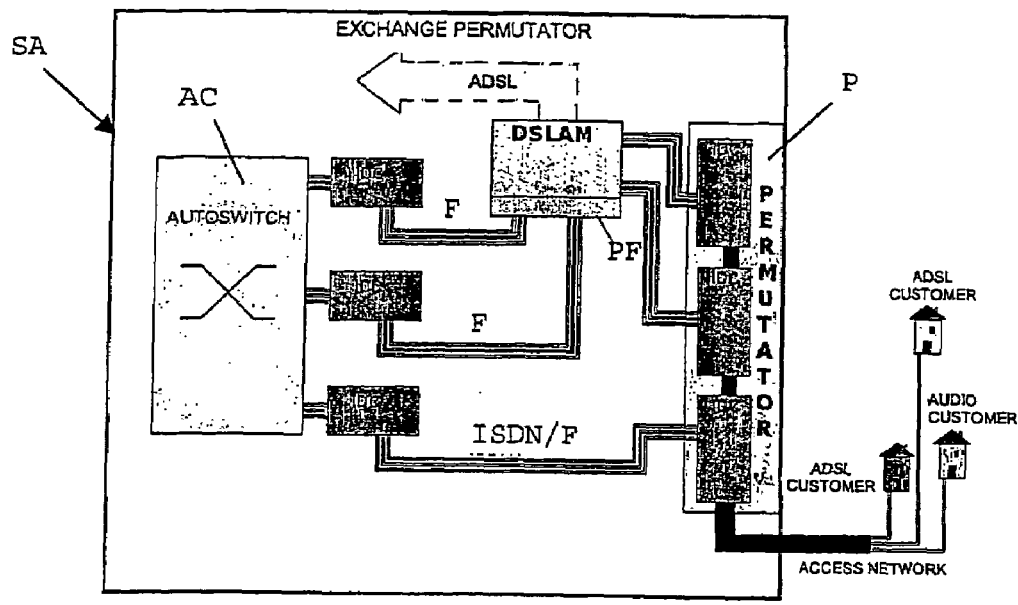
FIG. 1 is a diagram showing an exchange of the known type to which the access network is connected.
Figure 2:
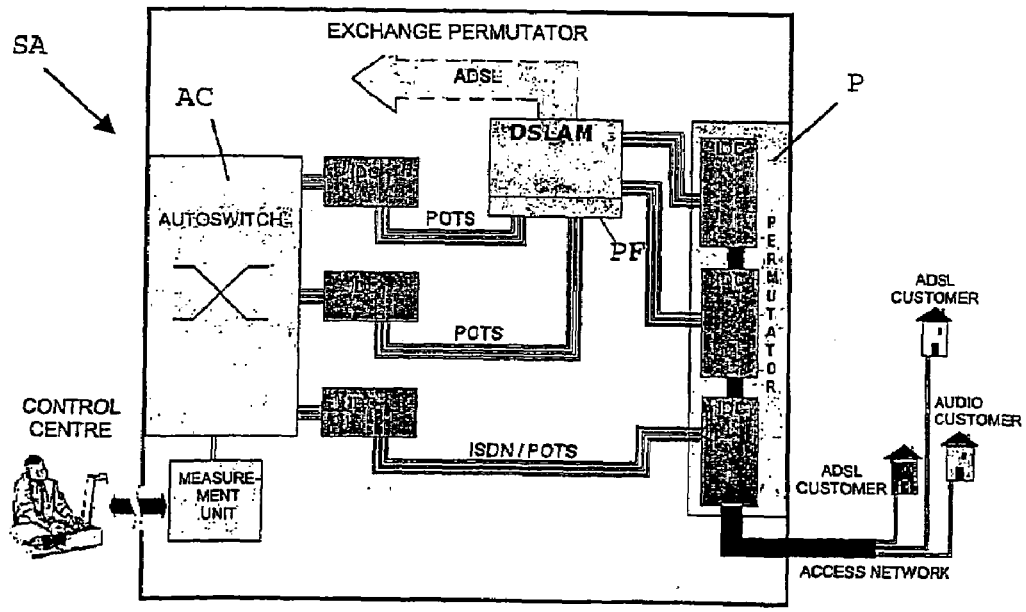
FIG. 2, similar to the preceding figure, shows the installation of a measurement unit of the know type in the exchange that is connected to the autoswitch of the exchange according to already tested techniques.

In order to illustrate in a more detailed way the scenery to which the invention is related, reference is made first to FIGS. 1 and 2.

From the diagram of FIG. 1 it appears that all of the lines connected to a customer are conveyed to a permutator P. The audio service dedicated lines F are connected directly to autoswitch AC, while ADSL (wideband) lines pass before being connected to the autoswitch through a device DSLAM of the known type that provides the wideband service by separating the same from the audio signal by a pots filter PF of the known type.

Control and measurement systems developed so far provide, as shown in the diagram of FIG. 2, the installation of a remote controlled measurement device in the exchange which is able to measure and to control the lines directly connected to the autoswitch by means of a known function of the autoswitch AC.

Although such a solution has the advantage of being brought about by only connecting a measurement unit to autoswitch AC, it has the following limits which has made it unsuccessful:
1. The quality of the qualification measurements is insufficient because of the limits caused by the transit of the line through autoswitch AC;
2. In case of an ADSL line, once the preventive qualification measurements are carried out and the service is activated, the line cannot be tested any longer by such system because of the already described separation filter PS which is connected between autoswitch AC and the line;
3. As the access network is designed with a redundancy of about 40% (every 100 lines from exchange C, 60 lines connect customers and 40 lines are only connected to permutator P and left as spare), all of the spare lines are not managed by the measurement system described above as they are not connected to the autoswitch;
4. The same limit of the preceding item is valid for all of the lines rented to other operators (unbundling).

Modern exchanges are usually provided, as an alternative to the permutator P, with a switch matrix access, however, the use of such matrixes in the already existing exchanges in which the lines are connected to a permutator cannot be applied in praxis due to the high cost involved by such operation.

Figure 3:
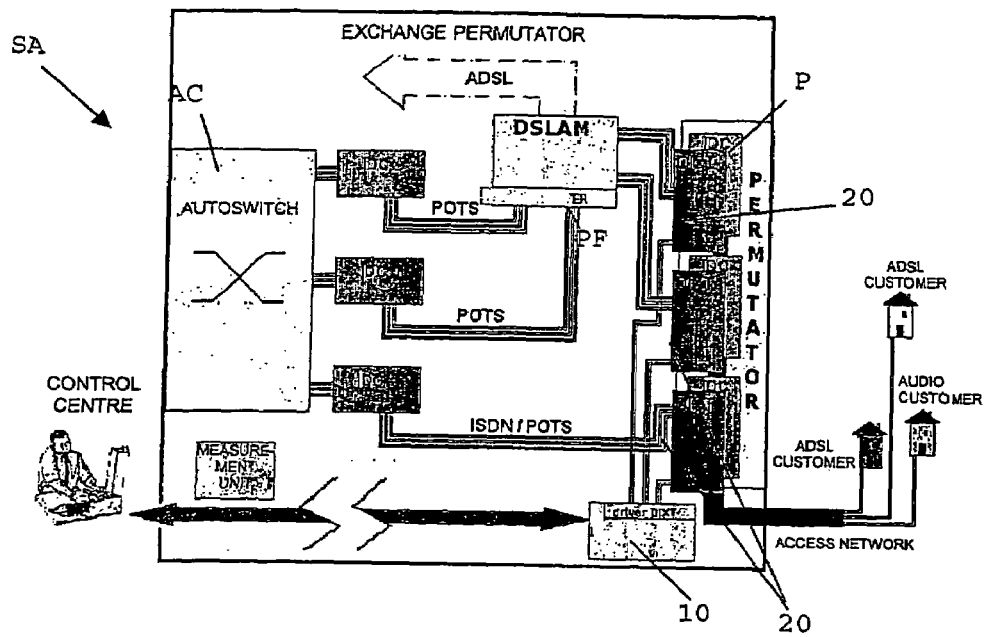
FIG. 3 shows schematically an exchange of the known type in which the apparatus according to the present invention is installed.
Figure 6:
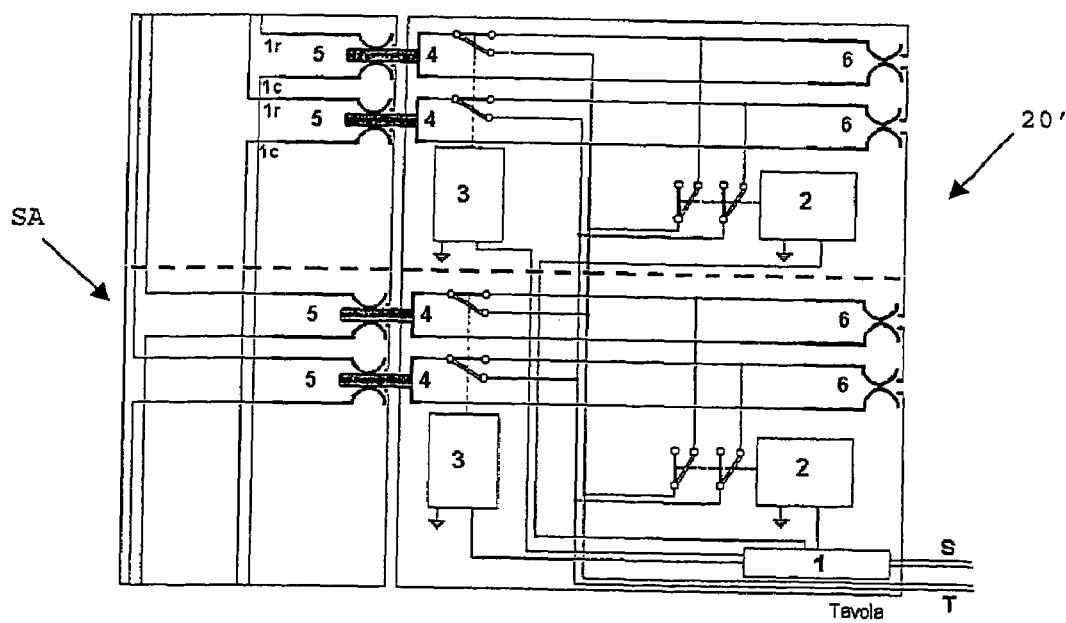
FIG. 6, similar to the preceding figure, shows a second simplified embodiment of an interface device according to the invention.

The diagram of FIG. 3 shows the solution according to the present invention, characterized by the installation of a remote controlled test and measurement device 10 at the exchange C which includes measurement apparatus connected to suitable devices 20 installed in the permutator P which are able to connect to all of the lines arriving to such permutator and then to all of the line pairs from the exchange which are either connected to a customer (rented) or redundant.

Such a solution allows the connecting device 20 to be connected to all of the lines and the above-mentioned limits of the known systems to be overcomes thus ensuring a complete, economic control of the access network because of the monitoring of all lines.

For example, the lines for any service, included the wideband service, can be qualified completely and advantageously both from the technical and economical point of view as the intervention of technicians in situ is not required. In case of failure, the system is able to detect remotely the point of failure, thus allowing the repair and the on line control of the quality of such repair. In addition, the invention is able both to detect the degradation of the lines and to locate any failure by a suitable software for monitoring continuously the lines, all of this being executed automatically with evident cost savings as well as improvements in the organization and the image to customers.

It is advisable now to disclose the measurement and control apparatus 10 and the relative connecting devices 20 according to the invention, that are installed in the strips connecting the line pairs (external telephone network) to the permutator P and are controlled directly by the measurement apparatus disclosed.

Figure 4:
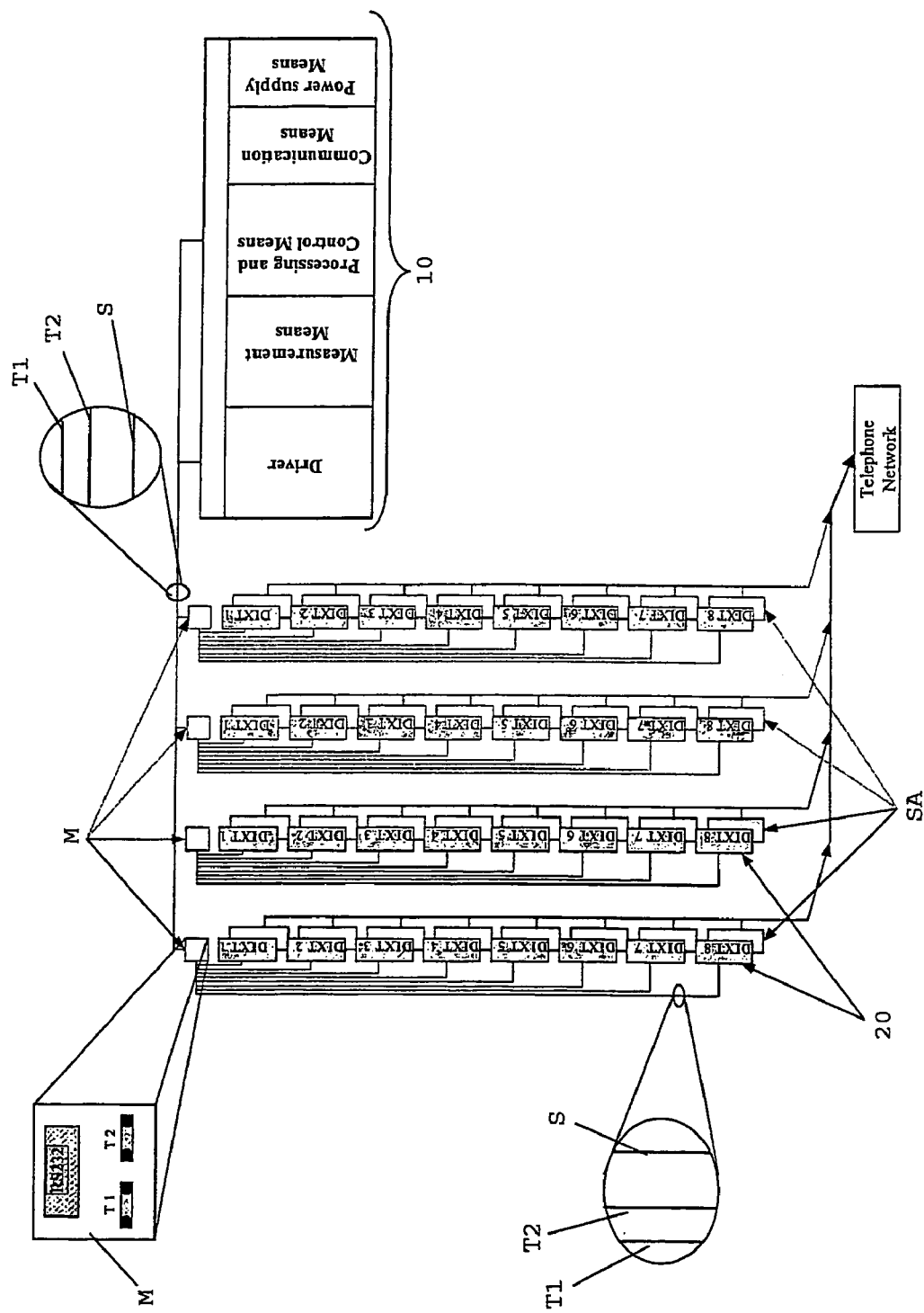
FIG. 4 is a block diagram of the apparatus according to the invention.

With particular reference to FIGS. 3 and 4, the present invention includes essentially:
- a measurement and control apparatus 10;
- a plurality of connecting devices 20 with the single connecting strips SA;
- a number of interface devices M, one for each column of permutator P, which connect the connecting devices 20 to the measurement and control apparatus 10.

More specifically the measurement and control apparatus 10 includes: means for the communication with the remote control centre; means for the measurement of the electric quantities and the transmission signals in the line pairs connected to exchange C; means for storing, processing and controlling signals received from/transmitted to the remote control centre; power supply means; a driver controlling the communication between the single line pair to be tested and the measurement means by driving the interface devices M and connecting devices 20.

It should be noted that each interface device M installed at the top of the respective column of the permutator P (or in another suitable position) is able to connect the selected line pair(s) to the measurement means according to the control signals received from such processing and control means in order to connect the connecting device 20 of each column to the measurement and control apparatus 10.

Each interface device M is connected to the other interface apparatus and the measurement and control apparatus 10 by two measurement line pairs T1 and T2 and a common control bus S.

In the preferred embodiment disclosed, each of them is provided with a serial gate by which the switching of the line pairs to the test terminal of line pairs T1 and T2 is controlled.

Furthermore, such interface devices M are able to recognize a tone transmitted from the external network or the exchange to test again the line pairs and to re-arrange the numbers of the exchange to the permutator P.

Figure 5:
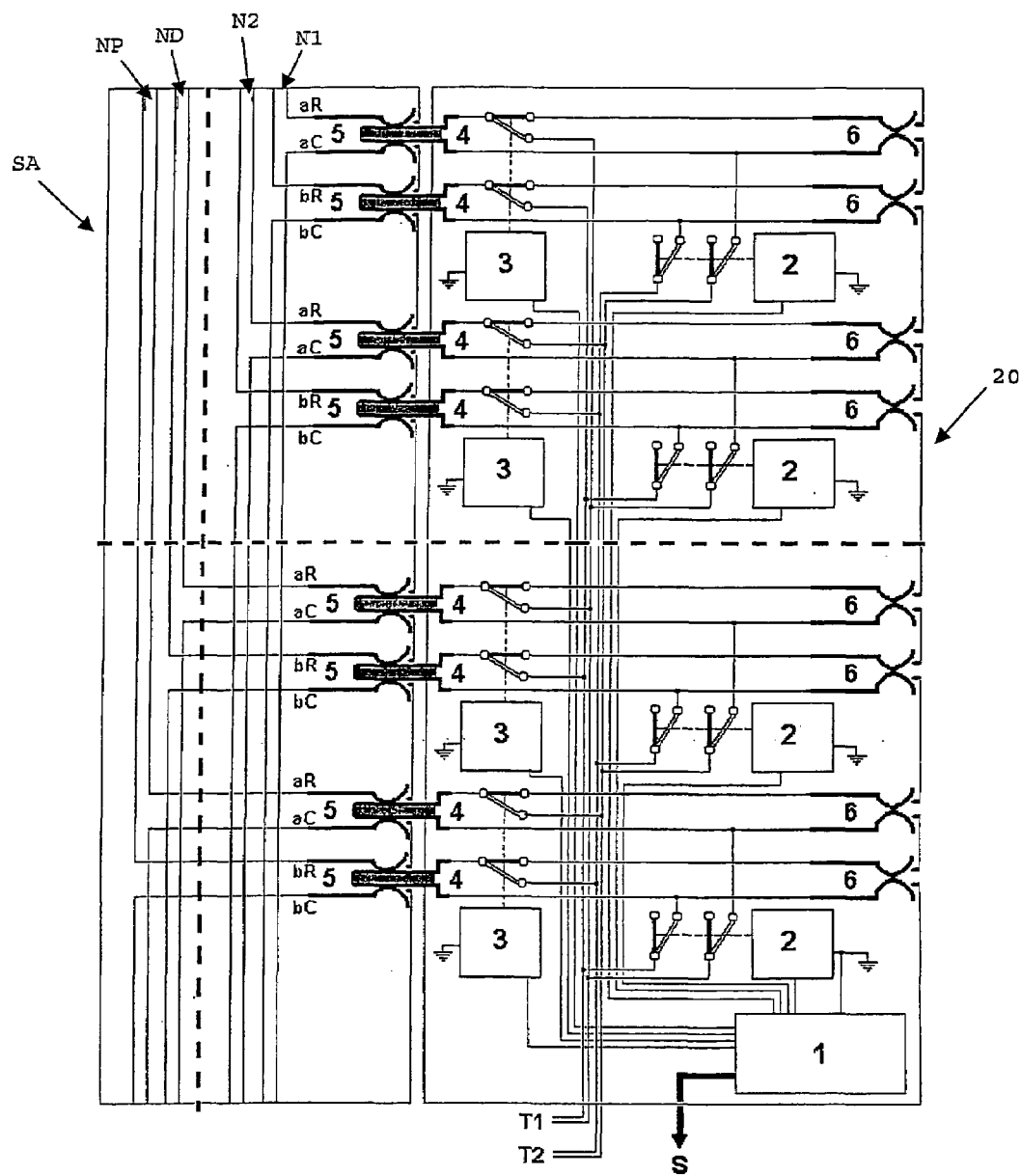
FIG. 5 is an exemplifying wiring diagram of a first embodiment of an interface device by which the measurement means is connected to the single line pairs connected to the exchange.

Each connecting device 20 shown schematically in FIG. 5 is connected to the interface device M corresponding to its column by two measurement line pairs T1–T2 and a control bus S.

Referring to the latter figure, it should be noted that according to a peculiar feature of the invention such connecting device 20 is able to connect, to section, and to transfer each line pair connected to the permutation strips, thus making them available to the above-mentioned measurement means.

According to the invention, this is advantageously carried out without the need of modifying in any way the existing wiring of permutator P. Only the first two line pairs N1, N2 and the n-th line pairs ND, NP are shown in the figure for the sake of clarity.

Each connecting-sectioning-transferring device 20 which is characterized by a low parasitic capacitance acts as a multiple sectioning plug and reproduces the exact geographic allocation of the sectioning points of the several existing vertical or horizontal connecting strips both on the side interfacing the existing strip SA and the side of the operators. The installation requires only the insertion of the single connecting devices or modules 20 into the respective connecting strips SA of the line pairs of the permutator P.

Each connecting-sectioning-transferring device 20 consists of a body which includes by way of a not limiting example two shells forming the two operating sections.

The "male" section interfacing connecting strips SA of permutator P is provided with the sectioning plugs 4 that once inserted into the corresponding sectioning points 5 establish both the mechanical connection between the existing strip SA and module 20 and the galvanic connection of each single connected line pair without the need of modifying the existing wiring.

Once the connecting-sectioning-transferring device 20 is connected, each generic line pair connected to, the network side "ar, br" of the sectioning point 5 of strip SA of permutator P is sectioned and galvanically interrupted by the contacts of the sectioning plug 4.

According to the invention, two on-line relays are provided for each line pair: a first sectioning relay 3 connected in series, and a second monitoring "sniffer" relay 2 connected in parallel.

The rest contacts of sectioning relay 3 ensure the normal continuity of the line pair before the connection of device 20, thus making such line pair available to the central side "ac, bc" of the sectioning point 5 through the rest contacts of the corresponding sectioning points 6 of the "female" section of device 20 which further put again in operation the strip in case the same line pair should be sectioned locally.

Suitably coded control signals relative to the line pair to be tested and the type of test to be executed are fed to an actuator 1 through bus S.

Accordingly, actuator 1 activates one of the sectioning relays 3 or monitoring relays 2 according to whether an intrusive or non-intrusive measurement has to be carried out, and gives back a signal indicating the established connection.

In case of an intrusive measurement, the action of relay 3 provides for sectioning a line pair so that the side of the network is made available on the test line pairs T1 if it is odd, and T2 if it is even.

In case of a non-intrusive measurement, relay 2 puts test line pair T2, if it is odd, or T1, if it is even, in parallel with the line to be tested.

The simultaneous action of the two sectioning relays 3, one for the even line pairs, the other for the odd line pairs, allows the network side of the two line pairs to be connected simultaneously to the measurement unit.

The simultaneous action of the two line relays 2 and 3 of a single line pair allows the network side and the exchange side of the tested line pair to be made available alternatively according to whether the selected line pair is odd or even.

As already mentioned, each connecting-sectioning-transferring module 20 is connected to other modules and the measurement and control apparatus 10 by only two test line pairs T1–T2 and a common bus S.

Advantageously, according to the invention, the relevant peculiarity of which is to avoid the need of wiring again each single line pairs connected to permutator P, thus also avoiding to twist the existing installation, it is possible to test all of the line pairs, thus optimizing the use of the high-technology apparatus disclosed herein which is able to carry out measurements without any need of providing new services and to provide a measurement and test system characterized by a great simplicity, cheapness, and installation velocity.

At last, it should be appreciated that the present invention allows qualification measurements, certifications, maintenance and failure detection to be carried out all over a network of a determined area directly from a control centre as well as any degradation of the line pairs and any failure to be automatically detected by a suitable software.

A second embodiment of the invention has connecting device 20' simplified with respect to those described so far. In fact, in this second embodiment each connecting device 20' is provided with only two line pairs to carry out measurements and to be controlled, only one test line pair T and a bus S.

As it has been described in the preceding embodiment, once the connecting-sectioning-transferring module 20' is connected, each generic line pair connected to the network side "lr" of the sectioning point 5 of strip SA of permutator P is sectioned and galvanically interrupted by the contacts of the sectioning plug 4.

According to the invention, two on line relays are provided for each line pair: a first sectioning relay 3 connected in series, and a second monitoring "sniffer" relay 2 connected in parallel.

The rest contacts of sectioning relay 3 ensure the normal continuity of the line pair before the connection of device 20', thus making such line pair available to the central side "lc" of the sectioning point 5 through the rest contacts of the corresponding sectioning points 6 of the "female" section of device 20' which further put again in operation the strip in case the same line pair should be sectioned.

Suitably coded control signals relative to the line pair to be tested and the type of test to be executed are fed to an actuator 1 through bus S.

Accordingly, actuator 1 activates one of the sectioning relays 3 or monitoring relays 2 according to whether an intrusive or non-intrusive measurement has to be carried out, and gives back a signal indicating the established connection.

In case of an intrusive measurement, the action of relay 3 provides for sectioning a line pair so that the side of the network is made available on the test line pairs T.

In case of a non-intrusive measurement, relay 2 puts test line pair T in parallel with the line to be tested.

As already mentioned, each connecting-sectioning-transferring module 20' is connected to other modules and the measurement and control apparatus 10 by only one test line pair T and a common bus S.

The present invention has been described and illustrated according to two preferred embodiments thereof, however, it should be understood anyone skilled in the art can make technically and/or functionally equivalent modifications and/or replacements without departing from the scope of the present industrial invention.

The invention claimed is:

1. A selective connecting device for use with an apparatus including a measurement apparatus used for the management and the remote and/or automatic control of electric characteristics and signal transmissivity in the metallic line pairs connected to a telephone exchange, the connecting device comprising:
   a first interface configured to be inserted in a connecting strip of the telephone exchange;
   a second interface configured to receive electrical connections to be connected to the connecting strip;
   a measurement interface; and a selection circuit configured to selectively connect, sectioning and transfer line pairs coupled to the first interface through the connecting strip to the second interface and the measurement interface.

2. An apparatus including a plurality of the connecting devices of claim 1 and further comprising the measurement apparatus and a plurality of interface devices connecting the connecting devices to the measurement apparatus.

3. The apparatus of claim 2, wherein the at least one of the connecting devices is installed in the connecting strip and wherein the connecting strip is installed in a permutator of the telephone exchange configured to selectively connect to all lines arriving to the permutator and to all of the line pairs from the telephone exchange which are either connected to a customer or redundant, said apparatus being configured to be installed in the telephone exchange and to be remote controlled via cable, or via ethernet, or locally controlled.

4. The apparatus of claim 3, wherein a connection of the at least one connecting device to all of the pairs is configured to allow the apparatus to detect remotely a point of failure and to perform an on line test of the quality of a repair of the detected point of failure.

5. The apparatus of claim 3, wherein the interface devices comprise one interface device for each column of the permutator, which connect the plurality of connecting devices to the measurement apparatus.

6. The apparatus of claim 5, wherein the measurement apparatus includes:
means for communication with a remote control centre;
means for measurement of electric quantities and transmission signals of line pairs connected to the telephone exchange;
means for storing, processing and controlling signals received from/transmitted to the remote control centre;
power supply means; and
a driver controlling communication between a single line pair to be tested and the measurement means by driving the interface devices and connecting devices.

7. The apparatus of claim 6, wherein each interface device is installed at its respective column of the permutator to connect the plurality of connecting devices of each column to the measurement apparatus and is configured to connect a selected one of the line pairs to the measurement apparatus based on control signals received from the means for storing, processing and controlling signals.

8. The apparatus of claim 6, wherein each interface device is connected to other interface apparatus and the measurement apparatus by one or more measurement line pairs and a common control bus.

9. The apparatus of claim 8, wherein each interface device includes a serial gate by which the switching of the line pairs to a test terminal one of the measurement line pairs or a test terminal of another of the line pairs is controlled.

10. The apparatus of claim 9, wherein the interface devices are configured to recognize a tone transmitted from an external network or the telephone exchange to test again at least one of the line pairs and to re-arrange numbers of the telephone exchanges to the permutator.

11. The apparatus of claim 9, wherein each connecting device is connected to the interface device corresponding to its column by the one or more measurement line pairs and the control bus.

12. The apparatus of claim 11, wherein at least one of the connecting devices is configured to act as a multiple sectioning plug and reproduces an exact geographic allocation of sectioning points of a plurality of existing vertical or horizontal connecting strips both at the first interface on a side interfacing the connecting strip and at the second interface on an operator side.

13. The apparatus of claim 12, wherein each connecting device includes a body which includes two shells forming "male" and "female" sections, respectively, the female of which reproduces sectioning points in which the male section is inserted.

14. The apparatus of claim 13, wherein the "male" section of the connecting device for interfacing the connecting strip of the permutator is provided with sectioning plugs that once inserted into the corresponding sectioning points establish both a mechanical connection between the connecting strip and the connecting device and a galvanic connection of each single connected line pair without modifying existing wiring, each line pair connected to a network side of the sectioning point of the connecting strip of the permutator being sectioned and galvanically interrupted by contacts of the sectioning plug in the first interface.

15. The apparatus of claim 14, wherein the connecting device includes two on-line relays for each line pair: a first sectioning relay connected in series, and a second monitoring "sniffer" relay connected in parallel.

16. The apparatus of claim 15, wherein contacts of the sectioning relay provide a same normal continuity of the line pair as before the connection of the connecting device to make such line pair available to a central side of the sectioning point through contacts of corresponding sectioning points of the "female" section of the connecting device which further put again into operation the strip in case the same line pair should be locally sectioned.

17. The apparatus of claim 16, wherein the connecting device includes an actuator module which, responsive to coded control signals relative to a line pair to be tested and a type of test to be executed through the common control bus, activates one of the line relays present in the device according to whether an intrusive or non-intrusive measurement is to be carried out, and gives back a signal indicating an established connection.

18. The apparatus of claim 17, wherein, in order to carry out an intrusive measurement, the first relay provides for sectioning a line pair so that the network side is made available on the test line pair or on the first test line pairs, if it is odd, and on the second test line pairs, if it is even.

19. The apparatus of claim 17, wherein, in order to carry out a non-intrusive measurement, the second relay puts the test line pair or the second test line pairs if it is odd, or the first test line pairs, if it is even, in parallel with a line to be tested.

20. The apparatus of claim 18, wherein simultaneous action of two of the first relays, one for even line pairs, the other for odd line pairs, allows the network side of the two line pairs to be connected simultaneously to the measurement apparatus, while simultaneous action of the first and second relays of a single line pair allows the network side and the exchange side of the tested line pair or the first and second test line pairs to be made available alternatively according to whether the selected line pair is odd or even.

* * * * *